(12) United States Patent
Holmes et al.

(10) Patent No.: US 7,846,051 B2
(45) Date of Patent: Dec. 7, 2010

(54) HYBRID POWERTRAIN WITH AN ENGINE INPUT CLUTCH AND METHOD OF CONTROL

(75) Inventors: Alan G. Holmes, Clarkston, MI (US);
Michael R. Schmidt, Carmel, IN (US);
Donald Klemen, Carmel, IN (US);
Gregory A. Hubbard, Brighton, MI (US); Anthony H. Heap, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 665 days.

(21) Appl. No.: 11/747,358

(22) Filed: May 11, 2007

(65) Prior Publication Data

US 2008/0280726 A1 Nov. 13, 2008

(51) Int. Cl.
*F16H 3/72* (2006.01)
(52) U.S. Cl. .......................................... 475/5
(58) Field of Classification Search ....................... 475/5
See application file for complete search history.

(56) References Cited

U.S. PATENT DOCUMENTS

| | | | | |
|---|---|---|---|---|
| 4,393,964 A | * | 7/1983 | Kemper | 477/6 |
| 5,931,757 A | | 8/1999 | Schmidt | |
| 6,093,974 A | * | 7/2000 | Tabata et al. | 290/40 R |
| 6,251,042 B1 | * | 6/2001 | Peterson et al. | 477/3 |
| 6,453,865 B2 | * | 9/2002 | Hirose et al. | 123/179.4 |
| 6,793,059 B2 | * | 9/2004 | Okada et al. | 192/84.1 |
| 6,953,409 B2 | | 10/2005 | Schmidt et al. | |
| 7,276,008 B2 | * | 10/2007 | Yasui et al. | 475/5 |
| 7,278,950 B2 | * | 10/2007 | Steen et al. | 475/303 |
| 7,282,003 B2 | * | 10/2007 | Klemen et al. | 475/5 |
| 2002/0059019 A1 | * | 5/2002 | Nakao et al. | 701/22 |

* cited by examiner

*Primary Examiner*—Ha D. Ho
(74) *Attorney, Agent, or Firm*—Quinn Law Group, PLLC

(57) ABSTRACT

A powertrain is provided with an input clutch that is disengagable to allow a transmission input member to rotate independently of engine speed under power of a motor and provide an alternative way to power vehicle accessories otherwise driven by engine torque, while still allowing the motor to start the engine. A powertrain having a parallel combination of input clutches including a friction input clutch and a selectable one-way clutch is provided, as well as a method of control of such a powertrain. Another method of controlling a hybrid vehicle powertrain includes starting the engine via torque from a motor with the input clutch biased in an engaged position. If vehicle operating conditions are more efficiently met without operating the engine, the input clutch is disengaged to so that torque is provided only by the motor to the output member and to vehicle accessories operatively connected to the input member.

4 Claims, 3 Drawing Sheets

HYBRID POWERTRAIN WITH AN ENGINE INPUT CLUTCH AND METHOD OF CONTROL

TECHNICAL FIELD

The invention relates to a hybrid powertrain having an input clutch between an engine and an input member of a transmission.

BACKGROUND OF THE INVENTION

Hybrid powertrains include an engine, one or more motors useful for propulsion and an energy storage device to power the motor or motors. One type of hybrid powertrain is a hybrid electric powertrain, which includes an electric motor/generator and a battery as the energy storage device. Another type of hybrid powertrain is a fluid hybrid powertrain, such as a hydraulic hybrid, using one or more fluid motors and a fluid accumulator as the energy storage device.

A specific type of hybrid electric powertrain uses an electrically variable transmission incorporating one or more differential gear sets. Power from the engine and/or from the motor/generators flows through different members of the differential gear set. A controller may control torque-transmitting mechanisms in various engagement schemes to offer a combination of operating modes, including electrically-variable and fixed ratio modes.

Vehicle accessories, such as a transmission pump, an air conditioning compressor and a power steering pump, are often driven by the engine crankshaft in a conventional vehicle. On a hybrid vehicle, because the engine is intentionally stopped under some driving conditions, an alternate way of powering such vehicle accessories is necessary. For example, these accessories are sometimes provided with individual electric motors or with a common electric motor to run several accessories.

SUMMARY OF THE INVENTION

It would be ideal to provide for alternative operation of the vehicle accessories from the engine or from the one or more motors already provided in the hybrid powertrain, while also providing for propulsion of the vehicle without turning the engine and for starting the engine without a separate starter motor and battery.

A hybrid powertrain has an engine, at least one motor operable for propulsion, an energy storage device to supply power to this motor and a mechanical transmission with an input member operating connected to the motor and to a vehicle accessory. The powertrain also has an input clutch that is disengagable to allow the transmission input member to rotate independently of engine speed and to power vehicle accessories otherwise driven by engine torque, while still allowing the engine to be started using motor power provided via the transmission input member.

Specifically, one embodiment of a powertrain with the scope of the invention includes a hybrid electro-mechanical transmission with an input clutch biased to an engaged state by a biasing member such as a spring. An actuating mechanism is operatively connected to a controller and is actuatable to selectively overcome biasing force of the biasing member to disengage the input clutch, thereby disconnecting the engine from the transmission. A vehicle accessory is operatively connected to the input member and may be driven by rotation of the input member via torque provided by the motor/generator when the input clutch is disengaged. The actuating mechanism may be hydraulically operated and the vehicle accessory may be a pump that provides the hydraulic pressure for actuating the actuating mechanism. Alternatively, the actuating mechanism may be an electrical actuator, such as a solenoid. In either case, a hydraulic accumulator may be operatively connected between the pump and the actuating mechanism to store hydraulic pressure (i.e., energy) and may be controllable to maintain hydraulic pressure to the input clutch, and to other torque-transmitting mechanisms and for general lubrication and cooling requirements of the transmission when the input member is not rotating and therefore the pump is not operating.

A method of controlling a hybrid vehicle powertrain is provided that includes starting the engine via torque from one or more motor/generators with the input clutch biased in an engaged position. At some point after the engine is started, it is determined that the vehicle operating conditions are more efficiently met by the motor/generator(s) without the engine, and the method includes disengaging the input clutch to disconnect the engine from the input member (and thereby from the transmission) so that torque is provided to the output member and to any vehicle accessories operatively connected to the input member only by the motor/generator(s). A second clutch, also referred to herein as a motor-connecting clutch or a lock-up clutch, may be provided and is selectively engaged to combine the torque of both motor/generator(s) at the output member in an electric-only drive mode.

If it is later determined that engine power is required to meet the operating demands placed on the powertrain, the method provides two alternative ways to restart the engine. First, the engine may be restarted by using torque of the motor/generator(s) to slow the input member and then by slipping the input clutch to gradually restart the engine. (If a pump is driven by the input member, a hydraulic accumulator may also be used to assist with transmission hydraulic needs if slowing the input member affects the output of the pump.) Alternatively, the input member may be stopped (rather than just slowed) by torque from the motor/generator. While the input member is stopped, hydraulic pressure may be maintained within the powertrain (including hydraulic pressure necessary to maintain the input clutch in a disengaged state, assuming a hydraulically-actuated actuating mechanism is used) by using energy stored in the hydraulic accumulator. While the input member is stopped, the input clutch is engaged and torque is then provided by the motor/generator(s) to rotate the input member and restart the engine.

In another embodiment of the invention, a hybrid powertrain includes an engine, a transmission having an input member operatively connectable to the engine, an output member for delivering power from the transmission, a motor operatively connectable to the input member and to the output member and capable of supplying torque to the output member for vehicle propulsion. An energy storage device provides power to or receives power from the motor. The motor may be a motor/generator and the energy storage device an electric battery. Alternatively, the motor may be a fluid motor and the energy storage device an accumulator. The powertrain further includes both a first input clutch, also referred to as the friction clutch, that acts by friction and is operated by an actuator and a second input clutch that may act in parallel with the first input clutch and that, in a particular state, can transmit torque in one direction only (e.g., a one-way clutch or a selectable one-way clutch). The friction clutch may be used to start the engine, and the one-way clutch may carry a majority of the engine torque from the engine while the engine is running. Furthermore, if the one-way clutch is a selectable one-way clutch that offers a selection of states including either a locked state in which it can transmit torque in either direction of rotation or an opposite state in which it can carry torque to the engine, then it can be used to start the engine when the input member is also starting from rest, and the friction clutch (i.e., the first input clutch) could then be engaged to carry torque to restart the engine only when the input member is rotating with the engine stationary (and propulsion being via the motor). It should be understood that for clarity, the discussion of one-way clutches herein refers to rotation of the engine and the input member always in a forward direction, but that those skilled in the art may construct the invention for operation that includes reversed rotation.

Alternatively, the one-way clutch (i.e., the second input clutch) may have only one state (i.e., be able only to carry torque from the engine). In that case, a third input clutch, such as centrifugal clutch, may be used to transmit torque from the input member to the engine when the input member is substantially stationary to start the engine, then automatically disengaging due to centrifugal force when the input member 112 rotates at higher speeds.

Typically, the torque for starting the engine cold is roughly half of the maximum torque that can be developed by the running engine and the torque for restarting the engine is roughly a quarter of the maximum engine torque. Therefore the combination of first and second input clutches (and, optionally the third input clutch) in parallel reduces the maximum load on the friction clutch and reduces the actuating force that must be used to operate the friction clutch. Reduced actuating force is easier to supply and to control precisely for smoother engine starting than with a higher capacity friction clutch.

The first input clutch may be a friction clutch that is selectively engaged by an actuator or a friction clutch that is engaged by a spring or other biasing member (i.e., normally in an engaged position) and disengaged by an actuator. The actuator may be hydraulic or electrical. The method of operation and control described above may be applied to this embodiment if having a first input (friction) clutch and a second input clutch if the friction clutch is engaged by a spring and disengaged by a hydraulic actuator.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
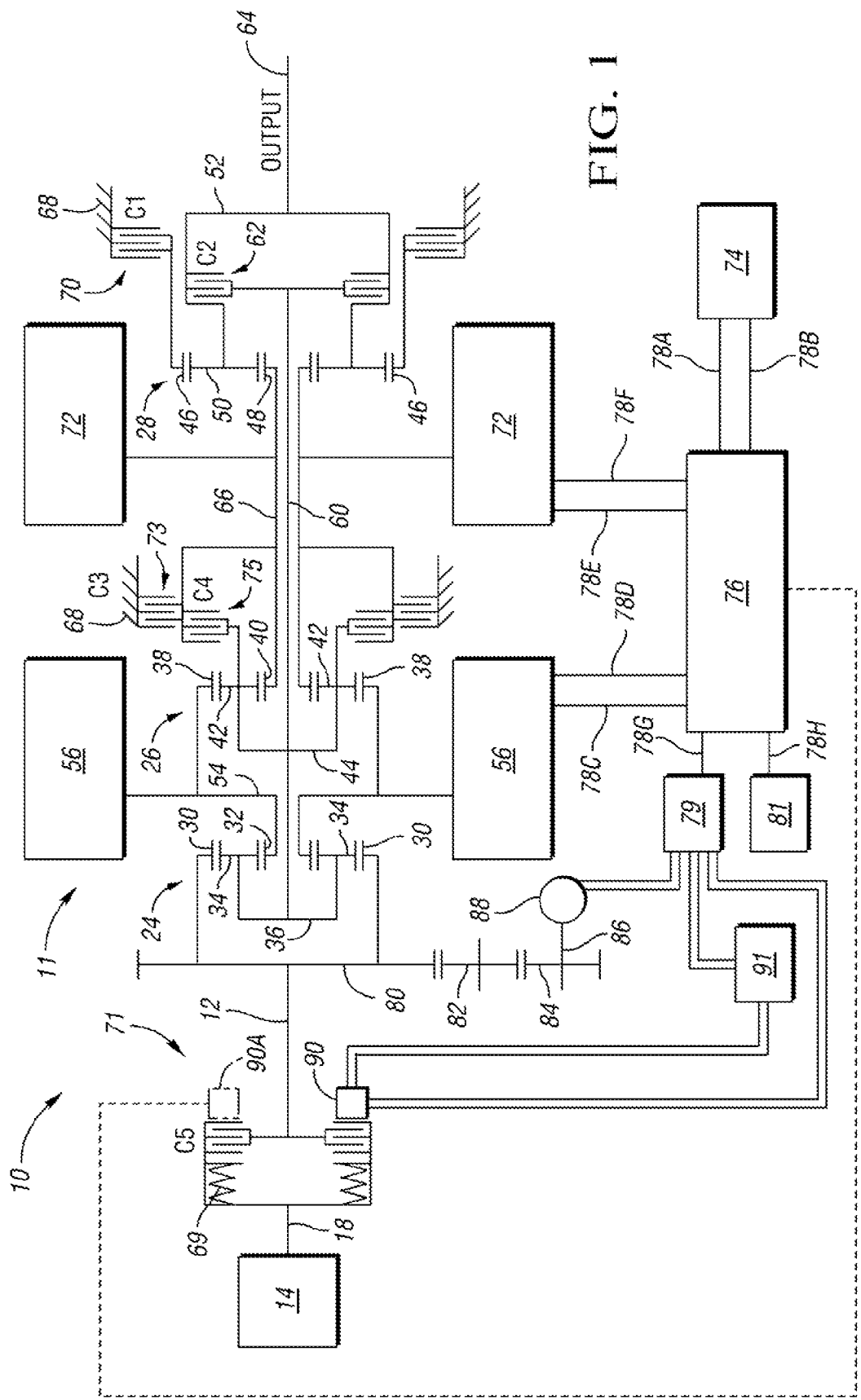
FIG. 1 is a schematic illustration of an exemplary embodiment of a powertrain within the scope of the invention, including an electrically-variable transmission and an input clutch biased into an engaged position by a spring.

One representative form of a powertrain embodying the concepts of the present invention is depicted in FIG. 1, and is designated generally by the numeral 10. The powertrain 10 includes a two-mode, compound-split, electro-mechanical transmission 11. It should be appreciated that many other embodiments of electro-mechanical transmissions may be used within the scope of the invention. The hybrid transmission 11 has an input member 12 that may be in the nature of a shaft and may be directly driven by an engine 14 that is also part of the powertrain 10. In the embodiment depicted, the engine 14 may be a fossil fuel engine, such as an internal combustion engine or a diesel engine.

The hybrid transmission 11 utilizes three planetary gear sets 24, 26 and 28, referred to herein collectively as a gearing arrangement. The first planetary gear set 24 has an outer gear member 30 that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32. The input member 12 is operatively connectable to the outer gear member 30 of the planetary gear set 24 in the transmission 11.

The second planetary gear set 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear set 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear sets 24, 26 and 28 are "simple" planetary gear sets in their own right, the first and second planetary gear sets 24 and 26 are compounded in that the inner gear member 32 of the first planetary gear set 24 is conjoined, as through a hub member 54, to the outer gear member 38 of the second planetary gear set 26. The conjoined inner gear member 32 of the first planetary gear set 24 and the outer gear member 38 of the second planetary gear set 26 are continuously connected to a first motor/generator 56.

The planetary gear sets 24 and 26 are further compounded in that the carrier 36 of the first planetary gear set 24 is conjoined, as through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, as through a torque-transmitting mechanism 62, also referred to herein as clutch C2.

The carrier 52 of the third planetary gear set 28 is connected directly to the transmission output member 64. When the hybrid transmission 11 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear set 26 is connected to the inner gear member 48 of the third planetary gear set 28, as through a sleeve shaft 66 that circumscribes shaft 60. The sleeve shaft 66 is also continuously connected to a second motor/generator 72. The outer gear member 46 of the third planetary gear set 28 is selectively connected to ground, represented by the transmission housing 68, through a torque-transmitting mechanism 70, also referred to herein as clutch C1, which is a stationary clutch or brake.

Torque-transmitting mechanism 71, which is also referred to herein as an input clutch C5, is selectively engagable to transfer engine torque from an engine output shaft 18 to the input member 12 and the first planetary gear set 24; specifically, from the input member 12 to the ring gear member 30. A biasing member 69 biases clutch 71 in an engaged position. In this embodiment, the biasing member 69 is a spring; however, other types of biasing members, including members having a magnetically or pneumatically applied biasing force may be utilized. All the planetary gear sets 24, 26 and 28 as well as the two motor/generators 56 and 72 are coaxially oriented, as about the axially disposed shaft 60. Both motor/generators 56 and 72 are of an annular configuration which permits them to circumscribe the three planetary gear sets 24, 26 and 28 such that the planetary gear sets 24, 26 and 28 are disposed radially inward of the motor/generators 56 and 72. This configuration assures that the overall envelope—i.e., the circumferential dimension—of the transmission 11 is minimized.

A torque-transmitting mechanism 73, also referred to herein as C3, which is a stationary clutch or brake, selectively connects the sun gears 40 and 48 with ground (i.e., with transmission housing 68). A torque-transmitting mechanism 75, referred to herein as a second clutch, a lock-up clutch or a motor-connecting clutch, an identified as C4, is operative when engaged to lock planetary gear sets 24, 26, motors 56, 72 and the input members 12 for common rotation as a group, by selectively connecting the sun gear 40 with the carrier 44. The torque-transmitting mechanisms 62, 70, 71, 73, 75 are all friction clutches.

Two members of differential gear sets 26 and 28 are operatively connectable to the output member 64 for rotation at two different speeds, each of the speeds being proportional to the speed of the output member 64. Specifically, engagement of clutch 70 operatively connects the sun gear members 40 and 48 to the output member 64. The speed of the sun gear members 40 and 48 is proportional to the speed of the output member as a function of the ratio of the number of teeth of the ring gear member 46 and the sun gear member 48 of the gear set 28. Engagement of clutch 62 connects shaft 60 with the output member 64, causing carrier members 36 and 44 to rotate at the same speed as the output member 64.

As should be apparent from the foregoing description, and with particular reference to FIG. 1, the transmission 11 selectively receives power from the engine 14. As will now be explained, the hybrid transmission 11 also receives power from an electric storage device 74 through one or both of the motor/generators 56, 72. The electric storage device 74 may be one or more batteries but will be referred to herein as a battery. Other electric storage devices that have the ability to store electric power and dispense electric power may be used in place of the batteries without altering the concepts of the present invention.

The electric storage device 74 communicates with a controller 76, also referred to as an electronic control unit by transfer conductors 78A and 78B. The controller 76 communicates with the first motor/generator 56 by transfer conductors 78C and 78D, and the controller 76 similarly communicates with the second motor/generator 72 by transfer conductors 78E and 78F. Additionally, the controller 76 communicates with a valve body 79 via transfer conductor 78G to control selective engagement or disengagement of torque transmitting devices 62, 70, 71, 73 and 75 via hydraulic fluid pressure, as is understood by those skilled in the art. Selective engagement of the torque-transmitting mechanisms 62, 70, 71, 73 and 75 along with control of the speed and torque of the motor/generators 56, 72 determines the operating mode of the transmission 11.

Sensors, designated generally as 81, may be operatively connected with the torque transmitting devices 62, 70, 71, 73 and 75 to provide, via transfer conductors, designated generally as 78H, sensed characteristics to the controller 76, such as temperature, torque load and relative speed of clutch plates.

A drive gear 80 fixedly connects the input member 12 to the outer gear member 30 of the first planetary gear set 24 (when input clutch 71 is engaged), and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a vehicle accessory 88. In this embodiment, the vehicle accessory is a transmission fluid pump; it should be understood, however, that within the scope of the invention, the vehicle accessory 88 may represent an air conditioning compressor, a power steering pump, or any other vehicle accessory that can be driven by rotation. The pump 88 receives fluid from a sump in the transmission 11 and supplies fluid to valves in the valve body 79 which are under the control of the controller 76. The details of the valve body 79 are not shown for purposes of simplicity and clarity in FIG. 1, but those skilled in the art will readily understand such a configuration.

The operator of the vehicle has three, well-known, primary devices to control the transmission 11. One of the primary control devices is a well-known drive range selector (not shown) that directs the controller 76 to configure the transmission 11 for either the park, reverse, neutral, or forward drive range. The second and third primary control devices constitute an accelerator pedal (not shown) and a brake pedal (also not shown). The information obtained by the controller 76 from these three primary control sources will hereinafter be referred to as the "operator demand." The controller 76 also obtains information from both the first and second motor/generators 56 and 72, respectively, the engine 14 and the electric storage device 74. In response to an operator's action, the controller 76 determines what is required and then manipulates the selectively-operated components of the hybrid transmission 11 appropriately to respond to the operator demand. The selectively-operated components are the engine 14, the motor/generators 56, 72, valves in the valve body 79 and the torque-transmitting mechanisms 62, 70, 71, 73 and 75, To reiterate, the transmission 11 is a two-mode, compound-split, electro-mechanical, vehicular transmission. In other words, the output member 64 receives power through two distinct alternative operative arrangements of gear trains within the transmission 11. A first electrically-variable mode is established when clutch 71 is engaged and the clutch 70 is engaged in order to "ground" the outer gear member 46 of the third planetary gear set 28. A second electrically-variable mode is selected when clutch 71 remains engaged, the clutch 70 is released and the torque-transmitting mechanism 62 is simultaneously engaged to connect the shaft 60 to the carrier 52 of the third planetary gear set 28.

As used herein, a "mode" is a particular operative mechanical arrangement, whether enabling a continuous range of speed ratios or only a fixed speed ratio, which is achieved in this embodiment by engagement of a particular torque-transmitting mechanism or torque-transmitting mechanisms 62, 70, 71, 73 and 75. In each electrically-variable mode, the speed ratio through the transmission is controlled by the speed and torque of the motor/generators 56 and 72.

Assuming clutch 71 is engaged, a first electrically-variable mode is achieved by engagement of clutch 70. A second electrically-variable mode is achieved by engagement of clutch 62. When the additional clutch is applied (i.e., when two clutching mechanisms are applied), a fixed input to output speed ratio is achieved. The rotations of the motor/generators 56, 72, will then be dependent on internal rotation of the mechanism as defined by the clutching and proportional to the input speed. The motor/generators 56 and 72 can still function as motors or generators; however, they are completely independent of engine to output power flow, thereby enabling both to be motors, both to function as generators, or any combination thereof. This allows, for instance, during acceleration in the first fixed ratio that the engine power and both units functioning as motors accepting power from the energy storage device 74 to be additive into propelling the vehicle through planetary gear set 28 to output 64.

The transmission can at any time be switched from operation in fixed ratio mode to an electrically-variable mode by turning the additional clutch off during a fixed ratio of operation. Determination of operation in fixed ratio mode or an electrically-variable mode is made by algorithms in the controller 76 controlling the transmission 11.

A first fixed ratio mode falls within the first electrically-variable mode of operation when C1, C4 and C5 (clutches 70, 71 and 75) are engaged, and a second fixed ratio range falls within the first electrically-variable mode of operation when C1, C2 and C5 (clutches 62, 70 and 71) are engaged. A third fixed ratio range is available during the second electrically-variable mode of operation when C2, C4 and C5 (clutches 62, 71 and 75) are engaged, and a fourth fixed ratio range is available during the second electrically-variable mode of operation when C2, C3 and C5 (clutches 62, 71 and 73) are engaged.

In the electrically-variable modes and fixed ratio modes described above, C5 (clutch 71) is engaged and the engine 14 is connected for rotation with the input member 12. Under certain predetermined operating conditions of the powertrain 10, such as during highway cruising, it may be desirable to disconnect the engine 14 from the input member 12 and provide power using only one or both of the motor/generators (powered via the storage device 74) in an electric-only mode. In that case, an actuating mechanism may be actuated to overcome the bias of the biasing member 69 and disengage clutch 71. The actuating mechanism may be a hydraulically-applied piston 90 movable via hydraulic pressure selectively routed to the clutch 71 via valves in valve body 79 under the control of controller 76. The hydraulic pressure necessary to move the piston 90 may be delivered from the pump 88, assuming the input member 12 is rotating to drive the pump 88. A hydraulic accumulator 91 is in fluid communication with the pump 88 to store pressurized fluid so that hydraulic pressure is maintained in the powertrain 10 when the input member 12 is not rotating and therefore not driving pump 88. When the input member 12 is not rotating and the controller 76 recognizes certain predetermined conditions and so determines that it is necessary to disengage the clutch 71, the controller 76 controls valves within the valve body 79 to direct fluid from the accumulator 91 to the piston 90. The accumulator 91 is also in fluid communication with the other torque-transmitting mechanisms 62, 70, 73 and 75 (fluid connections not shown in FIG. 1) so that they may be selectively engaged and disengaged via hydraulic pressure even when the input member 12 is not driving pump 88.

An electric actuator such as a solenoid 90A, shown in phantom, is an alternative actuating mechanism that may be provided in lieu of hydraulically-applied piston 90. The solenoid 90A is in signal communication with the controller 76 for receiving electrical actuating signals therefrom. Even if the solenoid 90A is used instead of hydraulic piston 90, the accumulator 91 may still be used to provide hydraulic pressure to the other torque-transmitting mechanisms 62, 70, 73 and 75, assuming they use hydraulically-actuated activating mechanisms, and for lubricating and cooling the transmission 11.

Figure 2:
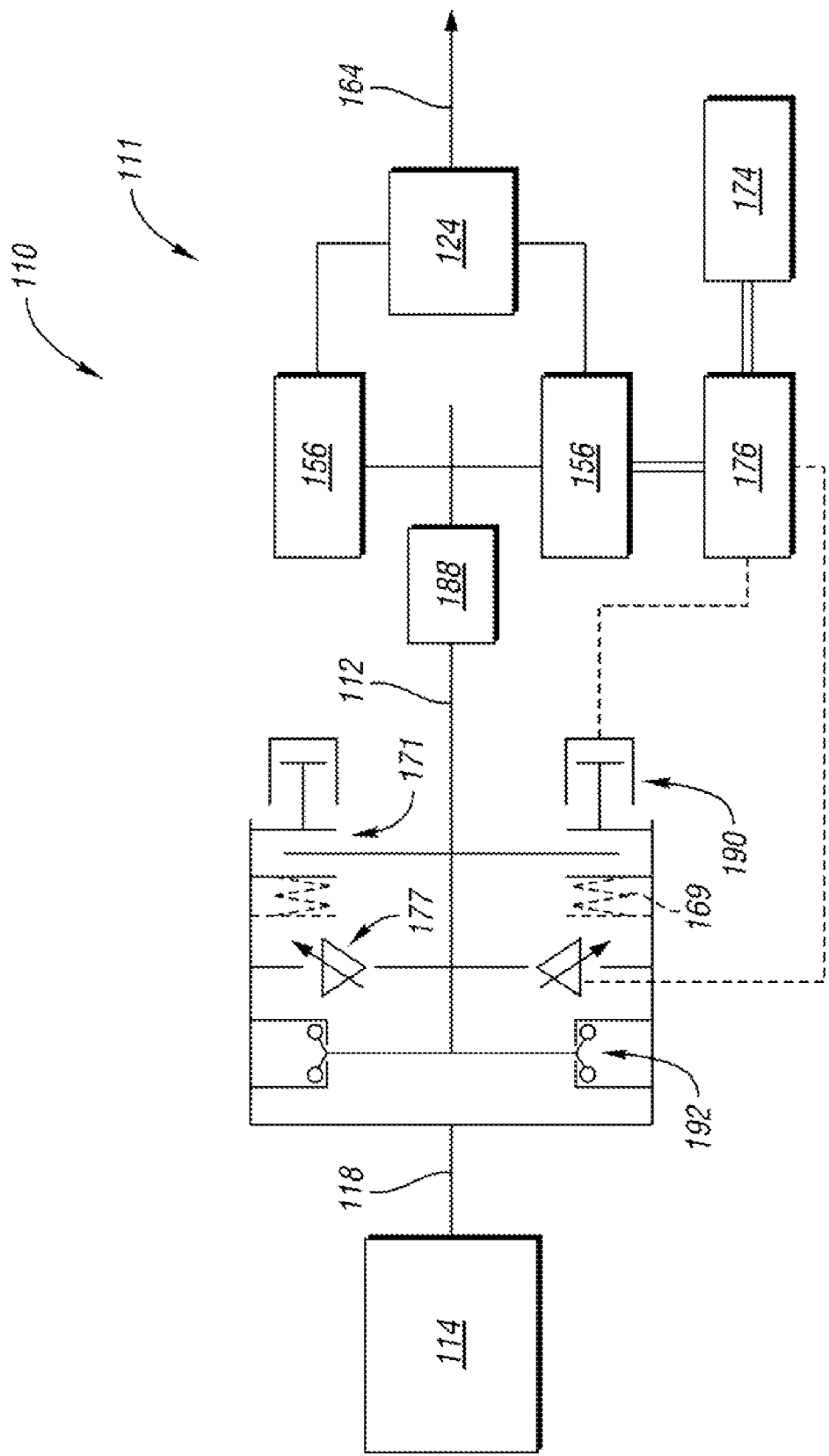
FIG. 2 is a schematic illustration of another exemplary embodiment of a powertrain within the scope of the invention, including a hybrid powertrain having a parallel combination of a friction input clutch and a one-way input clutch.

Referring to FIG. 2, another embodiment of a powertrain 110 is depicted having an engine 114 and a hybrid transmission 111 with an input member 112 and an output member 164. A vehicle accessory 188 is connected for common rotation with the input member 112 and may be operatively driven by the input member 112. A motor 156 is operatively connected to the input member and to the output member 164. The motor 156 is operable to provide torque to the output member 164 for propulsion of a vehicle having the powertrain 110. An optional gearing arrangement 124 is used to provide a gear ratio between the motor 156 and the output member 164, and may include any type of gears such as one or more planetary gear sets or a countershaft gear arrangement as well as selectively engagable torque-transmitting devices to achieve various gear ratios. Although not shown, a gearing arrangement may also be included between the input member 112 and the motor 156 and/or between the input member 112 and the accessory 188. Additionally, although only one motor 156 is shown, an additional motor may be included, and the gear arrangement 124 may be similar to that of the powertrain 10 of FIG. 1.

The motor 156 is operatively connected to an energy storage device 174 through a controller 176. The motor 156 may be an electric motor/generator, in which case the energy storage device 174 is an electric storage battery. In such an embodiment, operative connection between the controller 176 and the energy storage device 174 and between the controller 176 and the motor 156 would be through a power inverter (not shown).

Alternatively, the motor 156 may be a fluid motor (e.g., a pneumatic or hydraulic pump), in which case the energy storage device 174 is an accumulator (pneumatic or hydraulic, in correspondence with the fluid motor type). Regardless of whether the motor 156 is an electric motor/generator or a fluid motor, the controller 176 causes it to store energy (electric, hydraulic or pneumatic) in the energy storage device under certain predetermined operating conditions and receive stored energy from the energy storage device under other predetermined operating conditions.

An engine output member 118 is selectively connectable to the input member 112 via engagement of one or both of a parallel input clutch combination that includes first input clutch 171 and second input clutch 177. The first input clutch 171 is a friction clutch that is selectively engagable to connect the engine 114 with the input member 112. The first input clutch 171 may be biased into an engaged position via a biasing force or biasing member such as spring 169 and then selectively disengageable via an actuating mechanism 190. The actuating mechanism 190 may be an electrically actuated piston or solenoid, or an hydraulically actuated piston, under the control of the controller 176, as described above with respect to piston 90 (and alternative piston 90A) in FIG. 1.

The second input clutch 177 is selectively engagable to transmit torque in only one direction of rotation, i.e., a one-way state. Optionally, the second input clutch 177 is also selectively controllable to be engaged either in an opposite state in which it is able to carry torque in the opposite direction of rotation only or in a locked state in which it is able to carry torque in either direction (i.e., both directions) of rotation. Those skilled in the art will readily understand the functioning of selectable one-way clutches having an opposite or locked state.

Thus, a method of operating the transmission 111 includes selectively engaging the first input clutch 171 to start the engine 114 via power from the motor 156. Once started, the second input clutch 177 is engaged (in the one-way state) to transmit torque from the engine 114 to the input member 171, thus decreasing the amount of torque carried by the first input clutch 171. A decreased amount of torque carried by first input clutch 171 allows a decrease in the actuating force necessary to engage the first input clutch 171 (assuming that a biasing mechanism 169 is not used to bias the first input clutch 171 into an engaged position).

The transmission 111 may be controlled by the controller 176 such that the first input clutch 171 is engaged to restart the engine 114 when the input member 112 is rotating and the second input clutch (assuming it has an opposite or locked state) is used to start the engine when the input member 112 is not rotating (i.e., a cold start). For example, the first input clutch 171 is used to restart the engine 114 when the controller determines that the input member 112 is rotating and that predetermined conditions exist that warrant use if the engine 114 for propulsion. The second input clutch 177 is selectively engaged in the locked state so that it may carry torque from the input member to the engine 114 when the controller 176 determines that the engine 114 should be started and that the input member 112 is not rotating (i.e., the controller 176 receives an operator command for a cold start of the engine 114 (that is, a start of the engine after some period in which the transmission is not being operated). Alternately, if the second input clutch does not have an opposite or locked state, it may be desirable to have a third input clutch 192 that is selectively engaged in the locked state when the input member 112 is not rotating automatically without action of the controller 176 by any of a number of mechanical arrangements using centrifugal force generated by rotation of the input member 112, as will be readily understood by those skilled in the art. For example, the third input clutch 192 shown in FIG. 2 is a centrifugally unlocking clutch that is normally engaged to lock the input member 112 to the engine output member 118 when the input member 112 is substantially stationary, allowing torque from the motor 156 to start the engine 114, but then disengages due to centrifugal force when the input member 112 rotates at a speed greater then some predetermined minimum speed at which the third input clutch 192 is designed to automatically disengage. "Substantially stationary" means that the input members 112 is not rotating or is rotating at a very low speed less than the predetermined minimum speed at which the third input clutch 192 is designed to disengage by centrifugal force.

Figure 3:
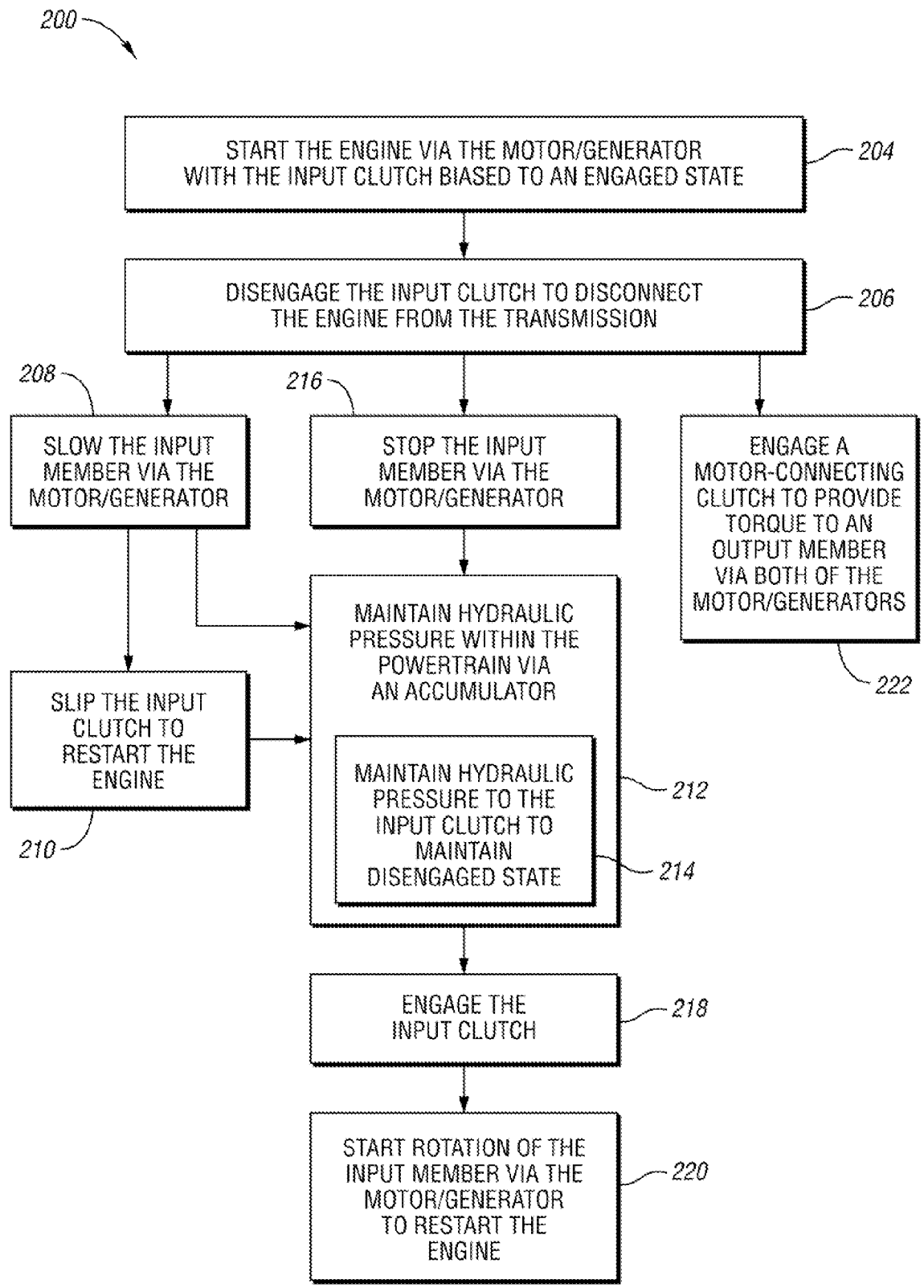
FIG. 3 is a flowchart illustrating a method of controlling a powertrain.

Referring to FIG. 3, a method 200 of controlling a powertrain is illustrated and will be described herein with respect to the powertrain 10 of FIG. 1. The method 200 involves engagement and disengagement of the input clutch 71 under various operating conditions.

Under step 204, the engine 14 is started via torque provided by the motor/generator 56 with the input clutch 71 biased to an engaged state via biasing member 69. Under operator demand for certain speed and/or acceleration conditions, it is more efficient to power the output member 64 using only torque from one or both motor/generators 56, 72 and not from the engine 14 (i.e., an electric-only mode). Under those conditions, the method 200 moves to step 206, in which the controller 76 commands the actuating mechanism (whether the hydraulic actuator 90 or the solenoid 90A) to actuate, thereby disengaging clutch 71 to disconnect the engine 14 from the transmission 11.

At some point after the engine is disconnected, operator demand for other conditions, such as acceleration, may require torque from the engine 14 in addition to torque from one or both of the motor/generators 56, 72. Under such conditions, the method 200 provides two alternative ways to restart the engine 14. The first set of steps that result in a restart of the engine are steps 208 and 210 (and optionally step 214). Under step 208, torque from the motor/generator 56 is applied to slow the rotational speed of the input member 12. When the input member 12 has been slowed to a predetermined speed, then under step 210, clutch 71 is slipped to restart the engine 14. As used herein, a "slipping" clutch is a clutch that is only partially engaged, so that it transfers torque at a controlled rate rather than more abruptly with an immediate, full engagement. By slipping clutch 71, the engine output shaft 18 is gradually brought to the speed of the transmission input member 12.

Because slowing of the input member 12 under step 208 slows rotation of the pump 88, it is necessary to provide hydraulic pressure to the powertrain 10 by alternative means. One alternative is provided in step 212, in which stored pressure in the hydraulic accumulator 91 is used to maintain hydraulic pressure within the powertrain 10 during steps 208 and 210. In a powertrain embodiment in which the hydraulically-actuated actuator 90 is used, step 212 includes substep 214, maintaining hydraulic pressure to the input clutch 71 to maintain the disengaged state (or at least the partially disengaged state as determined by the amount of slip under step 210) overcoming the bias of the biasing member 69.

As an alternative to slowing the input member 12 and slipping the input clutch 71 to restart the engine 14 under steps 208 and 210, the input member 12 may be completely stopped by applying torque from the motor/generator 56 under step 216. In that case, in the powertrain embodiment having the hydraulically-actuated actuator 90, the method 200 includes step 212 and step 214, as described above. After the input member is stopped under step 216, the method 200 also includes engaging the input clutch 71 under step 218 and then, under step 220, starting rotation of the input member 12 via torque from the motor/generator 56 to restart the engine 14 through the engaged clutch 71.

After the input clutch 12 is disengaged in step 206, it may be advantageous under some operating conditions to combine the torque of both motor/generators 56 and 72 to rotate the output member 64. Under step 222, the motor-connecting clutch 75 is engaged to lock the motor/generators 56, 72 for rotation at the same speed, as described above. If clutch 70 is also engaged, torque is provided to the output member 64 using the speed reduction ratio provided by planetary gear set 28.

Thus, by providing the powertrain 10 with the input clutch 71 having a biasing member 69 and an actuating mechanism (piston 90 or solenoid 90A) to disengage the clutch 71, a vehicle accessory 88 can still be driven by the motor/generator(s) 56 and 72 when the engine 14 is disconnected from the input member 12. A hydraulic accumulator 91 allows necessary hydraulic pressure to be provided when the pump 88 is not functioning due to a stopped or slowed input member 12. The motor-connecting clutch 75 allows for a combined torque from the motor/generators 56, 72 to power the output member 64 independent of engine speed when the clutch 71 is disengaged.

Although the method 200 is described with respect to the powertrain 10 of FIG. 1, it should be appreciated that the powertrain 110 of FIG. 2 may be controlled to operate according to the method 200, if the first input clutch 171 is biased in an engaged position by spring 169 and if actuating mechanism 190 is a hydraulic actuator such that the first input clutch 171 is disengaged by hydraulic pressure.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
   an engine;
   a hybrid electro-mechanical transmission having:
   an input member operatively connectable to said engine;
   an output member for delivering power from said transmission;
   a gearing arrangement operatively connectable to at least one of said input member and said output member; wherein said gearing arrangement includes a planetary gear set with a first rotatable member, a second rotatable member, and a third rotatable member;
   at least one motor/generator operatively connectable to said gearing arrangement and connected to an energy storage device operable for providing power to or receiving power from said at least one motor generator; and
   a controller operable for regulating electrical power interchange between said energy storage device and said at least one motor/generator;
   at least one vehicle accessory operatively connected to said input member such that said at least one vehicle accessory is driven by rotation of said input member;
   a selectively engageable input clutch connected between said engine and said input member;
   a biasing member configured to maintain said input clutch in an engaged state;
   an actuating mechanism operatively connected to said controller and actuatable to selectively overcome said biasing member to disengage said input clutch and thereby disconnect said engine from said input member; and wherein said at least one vehicle accessory is driven by said at least one motor/generator when said input clutch is disengaged;
   wherein said at least one motor/generator and said gearing arrangement are configured for at least one electrically-variable mode of operation in which the input member is operatively connected to the first rotatable member and the at least one motor/generator is operatively connected to the second rotatable member so that the speed of the third rotatable member varies as the speed of the at least one motor/generator is varied.

2. The powertrain of claim 1, wherein said actuating mechanism is an electric actuator.

3. A powertrain comprising:
   an engine;
   a hybrid electro-mechanical transmission having:
   an input member operatively connectable to said engine;
   an output member for delivering power from said transmission;
   a gearing arrangement operatively connectable to at least one of said input member and said output member;
   at least one motor/generator operatively connectable to said gearing arrangement and connected to an energy storage device operable for providing power to or receiving power from said at least one motor generator; and
   a controller operable for regulating electrical power interchange between said energy storage device and said at least one motor/generator;
   at least one vehicle accessory operatively connected to said input member such that said at least one vehicle accessory is driven by rotation of said input member;
   a selectively engageable input clutch connected between said engine and said input member;
   a biasing member configured to maintain said input clutch in an engaged state;
   an actuating mechanism operatively connected to said controller and actuatable to selectively overcome said biasing member to disengage said input clutch and thereby disconnect said engine from said input member; wherein said at least one vehicle accessory is driven by said at least one motor/generator when said input clutch is disengaged; wherein said at least one vehicle accessory includes a pump operatively connected to said actuating mechanism for providing hydraulic pressure to actuate said actuating mechanism; and wherein said actuating mechanism includes a hydraulically applied piston.

4. The powertrain of claim 3, further comprising:
   a hydraulic accumulator operatively connected between said pump and said actuating mechanism and controllable to selectively provide hydraulic pressure to the transmission when said input member is stationary.

* * * * *